US012794016B2

(12) United States Patent
Zhang et al.

(10) Patent No.: US 12,794,016 B2
(45) Date of Patent: Nov. 10, 2026

(54) BATTERY ELECTROLYTE CONTAINING BIFUNCTIONAL ADDITIVE AND APPLICATION THEREOF IN LITHIUM-SULFUR BATTERY

(71) Applicant: Kunming University of Science and Technology, Kunming City (CN)

(72) Inventors: Yingjie Zhang, Kunming (CN); Yiyong Zhang, Kunming (CN); Yannan Zhang, Kunming (CN); Jiyue Hou, Kunming (CN); Wenchang Han, Kunming (CN); Peng Dong, Kunming (CN); Xue Li, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 408 days.

(21) Appl. No.: 18/668,424

(22) Filed: May 20, 2024

(65) Prior Publication Data

US 2025/0070246 A1 Feb. 27, 2025

Related U.S. Application Data

(63) Continuation of application No. PCT/CN2024/083507, filed on Mar. 25, 2024.

(30) Foreign Application Priority Data

Aug. 23, 2023 (CN) ......................... 202311063522.1

(51) Int. Cl.
*H01M 10/0567* (2010.01)
*H01M 4/38* (2006.01)
(Continued)

(52) U.S. Cl.
CPC ....... *H01M 10/0567* (2013.01); *H01M 4/382* (2013.01); *H01M 4/583* (2013.01);
(Continued)

(58) Field of Classification Search
CPC ........... H01M 10/0567; H01M 10/052; H01M 10/058; H01M 10/4235; H01M 10/0569;
(Continued)

(56) References Cited

U.S. PATENT DOCUMENTS 9,748,606 B2 * 8/2017 Shatunov .......... H01M 10/0567
10,177,350 B2 1/2019 Akita
(Continued)

FOREIGN PATENT DOCUMENTS

CN 1327620 12/2001
CN 107556941 1/2018
(Continued)

OTHER PUBLICATIONS

Oravec et al. Electropolymerization of monosodium salts of triazine thiols in magnetic field, IEEE Explore, vol. 14, Issue 2, Jun. 30, 2004, pp. 1592-1595. Retrieved from https://ieeexplore.ieee.org/document/1325106 (Year: 2004).*
First Office action from SIPO dated Jan. 31, 2024 in application No. 202311063522.1.

*Primary Examiner* — James M Erwin
(74) *Attorney, Agent, or Firm* — Pilloff Passino & Cosenza LLP; Rachel K. Pilloff; Sean A. Passino

(57) ABSTRACT

Provided are a battery electrolyte containing a bifunctional additive and an application thereof in a lithium-sulfur battery, belonging to the technical field of lithium-sulfur battery electrolyte. According to the disclosure, a bifunctional additive of a triazine thiol compound is used as an additive, and triazine groups and thiol groups cooperate.

7 Claims, 4 Drawing Sheets

(51) Int. Cl.

| | |
|---|---|
| ***H01M 4/583*** | (2010.01) |
| ***H01M 10/052*** | (2010.01) |
| ***H01M 10/0569*** | (2010.01) |
| *H01M 4/02* | (2006.01) |

(52) U.S. Cl.
CPC ..... *H01M 10/052* (2013.01); *H01M 10/0569* (2013.01); *H01M 2004/027* (2013.01); *H01M 2004/028* (2013.01)

(58) Field of Classification Search
CPC ........ H01M 4/38; H01M 4/382; H01M 4/583; H01M 2004/027; H01M 2004/028; Y02E 60/10
USPC .......................................................... 429/188
See application file for complete search history.

(56) References Cited

U.S. PATENT DOCUMENTS

| | | | | |
|---|---|---|---|---|
| 10,483,591 | B2 | 11/2019 | Moganty | |
| 2021/0057753 | A1 * | 2/2021 | Viner .................... | H01M 4/366 |

FOREIGN PATENT DOCUMENTS

| | | | | |
|---|---|---|---|---|
| CN | 110892568 | | 3/2020 | |
| CN | 111205322 | | 5/2020 | |
| CN | 115461904 | | 12/2022 | |
| CN | 115699419 | | 2/2023 | |
| JP | 2006241542 | | 9/2006 | |
| JP | 2010061932 | | 3/2010 | |
| WO | WO-2009077840 | A2 * | 6/2009 | .......... H01M 50/562 |

* cited by examiner

BATTERY ELECTROLYTE CONTAINING BIFUNCTIONAL ADDITIVE AND APPLICATION THEREOF IN LITHIUM-SULFUR BATTERY

CROSS-REFERENCE TO RELATED APPLICATIONS

This disclosure is a continuation of PCT/CN2024/083507, filed Mar. 25, 2024 and claims priority of Chinese Patent Application No. 202311063522.1, filed on Aug. 23, 2023, the contents of which are hereby incorporated by reference.

TECHNICAL FIELD

The disclosure belongs to the technical field of lithium-sulfur battery electrolyte, and in particular to a battery electrolyte containing a bifunctional additive and an application thereof in a lithium-sulfur battery.

BACKGROUND

In a new energy storage system, lithium-sulfur battery, as a potential substitute for advanced lithium-ion battery, is coupled with high-capacity sulfur cathode (1675 milli ampere/hours per gram (mAh $g^{-1}$)) and lithium metal anode (3860 m Ah $g^{-1}$) to provide very high theoretical energy densities (2600 watt-hours per kilogram (Wh $kg^{-1}$) and 2800 watt-hours per litre (Wh $L^{-1}$). In addition, elemental sulfur has advantages of low price, abundant resources, and environmental friendliness, making the system highly commercially valuable and recognized as one of the most promising next-generation battery systems.

Although lithium-sulfur batteries have great advantages in energy density and cost, there are still many problems that are difficult to solve. On the one hand, lithium polysulfide (LiPSs) with high solubility will diffuse from the anode to the electrolyte under the action of concentration gradient, resulting in a “shuttle effect”. On the other hand, the existence of polysulfide may aggravate the side reaction at the interface of lithium anode, consume lithium metal and affect the transmission performance of lithium ions. These problems will lead to the loss of active materials, the decrease of coulombic efficiency, the short cycle life and irreversible capacity attenuation of lithium-sulfur batteries, resulting in a decline of battery performance.

In view of the above problems, the current research progress mainly focuses on the cathode materials. By modifying the structures of sulfur cathode materials, such as synthesizing binary metal sulfides, organic sulfides, sulfur/metal oxide composites, sulfur/carbon composites, sulfur/polymer composites, etc., polysulfides or sulfur main materials are confined, or catalysts such as oxides, sulfides or nitrides are introduced into the cathode. These strategies may inhibit the shuttle effect of polysulfide ions to some extent and improve the utilization rate of active substances. However, these methods are complicated in the synthesis path and may increase the battery manufacturing costs, and rarely consider the influence of the anode interface, which is not conducive to the practical application of lithium-sulfur batteries.

SUMMARY

In order to solve the above technical problems, the disclosure provides a battery electrolyte containing a bifunctional additive and an application thereof in a lithium-sulfur battery in a lithium-sulfur battery. The bifunctional additive may catalyze transformation of polysulfides, improve a utilization rate of sulfur, and at the same time form a layer of solid electrolyte interphase (SEI) on a surface of a lithium metal anode, effectively slowing down a side reaction at an anode interface, and greatly improving a capacity, coulombic efficiency and long-cycle stability of the lithium-sulfur battery.

The disclosure is specifically realized by following technical schemes.

One of the technical schemes is a battery electrolyte containing a bifunctional additive, where the bifunctional additive is a triazine thiol compound, and a concentration of the bifunctional additive in the battery electrolyte is 0.2-3 weight percentage (wt %).

In an embodiment, the triazine thiol compound is at least one of 6-(dibutylamino)-1,3,5-triazine-2,4-dithiol, 4-amino-1,3,5-triazine-2-thiol, 4-phenyl-1,3,5-triazine-2-thiol and 5,6-diphenyl-[1,2,4]triazine-3-thiol.

The disclosure uses the bifunctional additive of the triazine thiol compound as an additive to improve the performance of the lithium-sulfur battery. Due to a synergistic effect of triazine groups and thiol groups, an interface problem between a cathode and an anode of the lithium-sulfur battery is significantly improved, and transformation of polysulfides may be regulated, a shuttle effect may be effectively suppressed and a coulombic efficiency of the battery may be improved, so that better cycle stability may be achieved. Moreover, a preparation method is simple and convenient for mass production.

In an embodiment, the battery electrolyte also includes an ether solvent and a lithium salt.

In an embodiment, the ether solvent is a mixed solution of ethylene glycol dimethyl ether (DME) and 1,3-dioxolane (DOL).

In an embodiment, a volume ratio of ethylene glycol dimethyl ether to 1,3-dioxolane is 1:1.

In an embodiment, the lithium salt is a mixture of lithium bis (trifluoromethylsulfonyl)imide (LiTFSI) and lithium nitrate ($LiNO_3$), where a concentration of LiTFSI in the electrolyte is 1 mol/litre (mol/L), and a concentration of $LiNO_3$ in the electrolyte is 1-2 wt %.

In a second technical scheme, a lithium-sulfur battery includes a cathode material, an anode material, a separator and a battery electrolyte containing the bifunctional additive.

In an embodiment, the cathode material is a sulfur-carbon cathode material, and the sulfur-carbon cathode material is an aluminum foil current collector loaded with elemental sulfur, and sulfur loading is 1-1.5 milligrams per square centimeter (mg·$cm^{-2}$).

In an embodiment, a preparation method of the aluminum foil current collector loaded with elemental sulfur includes following steps: mixing multi-walled carbon nanotubes (MWCNTs) with sulfur powder(S) in a mass ratio of 3:7, grinding a mixture of MWCNTs and S in a mortar for 30 minutes (min) to make the mixture evenly mixed, putting the mixture in a reaction kettle, and filling argon into a tube furnace to keep a temperature at 155° C. for 12 hours (h) to obtain S@MWCNTs; mixing and grinding the S@MWCNTs and Super P conductive carbon black and a binder polyvinylidene difluoride (PVDF) in a mass ratio of 7:2:1, dissolving with N-methylpyrrolidone (NMP), and then coating on the aluminum foil current collector, and drying at 60° C. for 8 h in a vacuum oven.

In an embodiment, the anode material is a lithium metal sheet, and the separator is Celgard-2500.

A third technical scheme is an application of the battery electrolyte containing the bifunctional additive in preparation of the lithium-sulfur battery.

In an embodiment, when the triazine thiol compound is used as an electrolyte additive in a lithium-sulfur electrolyte, the electrolyte containing the triazine thiol compound is dripped on both sides of the separator to contact the cathode and the anode.

Advantages of the disclosure are as follows.

The electrolyte of the lithium-sulfur battery provided by the disclosure uses the triazine thiol compound as a bifunctional additive to improve the cycle performance of the lithium-sulfur battery and promote a dynamic process of the whole battery.

In the lithium-sulfur battery provided by the disclosure, the triazine thiol compound contained in the electrolyte is bifunctional. On one hand, these compounds may react with polysulfides, which is beneficial to regulation of the transformation of long-chain polysulfides, and may improve the discharge capacity and show less polarization. On an other hand, the SEI will be generated at the anode interface, which may protect the anode, accelerate charge transfer and improve the coulombic efficiency.

The battery electrolyte additive provided by the disclosure has wide sources, excellent cycle stability and high specific capacity, and has commercial application potential.

BRIEF DESCRIPTION OF THE DRAWINGS

In order to explain technical schemes of the disclosure or technical schemes in the prior art more clearly, drawings needed in embodiments are briefly introduced below. Obviously, the drawings in a following description are only some embodiments of the disclosure. For ordinary people in the field, other drawings may be obtained according to these drawings without paying a creative labor.

DETAILED DESCRIPTION OF THE EMBODIMENTS

Figure 1:
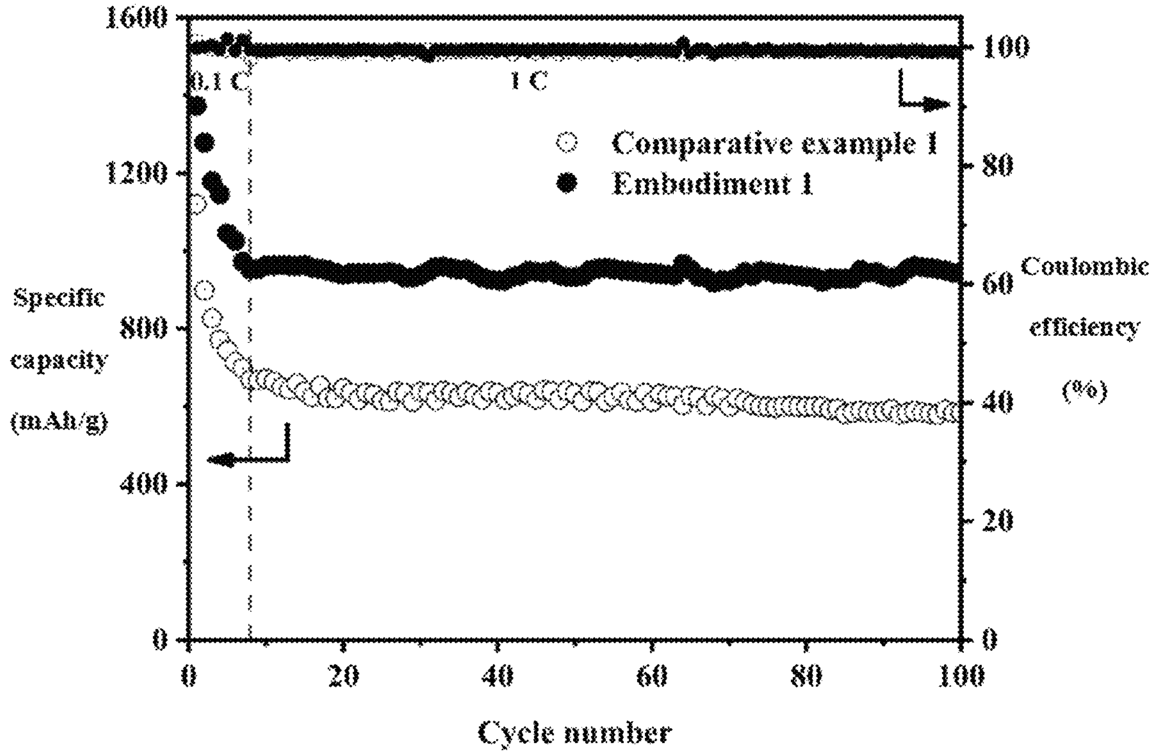
FIG. 1 is a graph showing a cycle performance and a coulombic efficiency of a lithium-sulfur battery containing 6-(dibutylamino)-1,3,5-triazine-2,4-dithiol in Embodiment 1 of the disclosure and no 6-(dibutylamino)-1,3,5-triazine-2,4-dithiol in Comparative example 1.

In order to make a purpose and technical schemes of embodiments of the disclosure more clear, the technical schemes of the disclosure will be described clearly and completely with reference to attached drawings in the specification and specific embodiments. Obviously, the described embodiments are only part of the embodiments of the disclosure, but not all of them. Based on the embodiments in the disclosure, all other embodiments obtained by ordinary technicians in the field without creative labor belong to a protection scope of the disclosure.

It should be understood that the terminology described in the disclosure is only for describing specific embodiments and is not used for limiting the disclosure. In addition, for a numerical range in the disclosure, it should be understood that each intermediate value between an upper limit and a lower limit of the range is also specifically disclosed.

It is obvious to those skilled in the art that many improvements and changes may be made to the specific embodiments of the present specification without departing from the scope or spirit of the disclosure. The description and embodiments of the disclosure are exemplary only.

A battery electrolyte according to the disclosure includes lithium salts, ether solvents and a bifunctional additive. The lithium salts are $LiNO_3$ and LiTFSI, a concentration of $LiNO_3$ in the electrolyte is 1-2 wt %, and a concentration of LiTFSI in the electrolyte is 1 mol/L. The ether solvents are DME and DOL with a volume ratio of 1:1. The bifunctional additive is a triazine thiol compound, and the triazine thiol compound is at least one of 6-(dibutylamino)-1,3,5-triazine-2,4-dithiol, 4-amino-1,3,5-triazine-2-thiol, 4-phenyl-1,3,5-triazine-2-thiol and 5,6-diphenyl-[1,2,4]triazine-3-thiol.

Triazine thiol compounds, lithium-sulfur electrolytes with different lithium salt concentrations, battery cases, separators and metal lithium sheets involved in the embodiments of the disclosure are all purchased from the market, and the disclosure has no special restrictions on models of the battery cases, lithium sheets and separators.

A preparation method of aluminum foil current collector (sulfur-carbon cathode material) loaded with elemental sulfur in the embodiment of the disclosure is as follows: multi-walled carbon nanotubes (MWCNTs) are mixed with sulfur powder(S) in a mass ratio of 3:7, put in a mortar and ground for 30 minutes (min) to make them are evenly mixed, put in a reaction kettle, and keep a temperature at 155° C. for 12 h in a tube furnace to obtain S@MWCNTs. S@MWCNTs, Super P conductive carbon black and a binder PVDF are mixed and ground in a mass ratio of 7:2:1, dissolved with NMP (N-methylpyrrolidone), then coated on the aluminum foil current collector, and dried at 60° C. for 8 hours in a vacuum oven.

In order to better understand the disclosure, contents of the disclosure will be further clarified with specific embodiments. It should also be understood that specific process parameters and so on in the following examples are only one example in the appropriate range, that is, those skilled in the art may make choices within the appropriate range through the description herein, and are not limited to specific values in the following examples.

Embodiment 1

Preparation of electrolyte: in a glove box ($O_2$, $H_2O$<0.01 parts per million (ppm)) filled with argon, 1.0 mol/litre (M) of LiTFSI is added to a mixed solvent of DME and DOL, where DME:DOL (V:V)=1:1, and then 1 wt % of 6-(dibutylamino)-1,3,5-triazine-2,4-dithiol and 2 wt % of $LiNO_3$ (the concentration of $LiNO_3$ in the electrolyte is 2 wt %, the same below) are added, and a lithium-sulfur battery electrolyte containing 1 wt % of 6-(dibutylamino)-1,3,5-triazine-2,4-dithiol is obtained after uniform mixing.

Battery assembly: a pole piece coated with sulfur-carbon cathode material is cut into circular pole pieces with a diameter of 12 millimeters (mm) by a punching machine, and the sulfur loading is 1 milligram (mg)/square centimeter ($cm^2$). The lithium-sulfur battery electrolyte prepared in Embodiment 1 is used, and an electrolyte amount is 20 microliter (μL)/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance of the lithium-sulfur battery is verified.

Electrochemical performance test: after the assembled battery stand still at 25° C. for 8 h, it is charged and discharged at a rate of 1 C between 1.7 volt (V) and 2.8 V. In addition, in order to verify the generation of negative solid electrolyte interphase (SEI), an AC impedance test is used. An amplitude of impedance test is 10 millivolt (mV), and a frequency range is $10^{-2}$-$10^5$ hertz (Hz).

Embodiment 2

Preparation of electrolyte: in a glove box ($O_2$, $H_2O$<0.01 ppm) filled with argon, 1.0 M of LiTFSI is added to a mixed solvent of DME and DOL, where DME:DOL (V:V)=1:1, and then 0.5 wt % of 6-(dibutylamino)-1,3,5-triazine-2,4-dithiol and 1 wt % of $LiNO_3$ are added, and a lithium-sulfur battery electrolyte containing 0.5 wt % of 6-(dibutylamino)-1,3,5-triazine-2,4-dithiol is obtained after uniform mixing.

Battery assembly: a pole piece coated with sulfur-carbon cathode material is cut into circular pole pieces with a diameter of 12 mm by a punching machine, and the sulfur loading is 1.5 mg/cm$^2$. The lithium-sulfur battery electrolyte prepared in Embodiment 2 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance test is the same as in Embodiment 1.

Embodiment 3

Preparation of electrolyte: in a glove box ($O_2$, $H_2O$<0.01 ppm) filled with argon, LiTFSI is added to a mixed solvent of DME and DOL, where DME:DOL (V:V)=1:1, and then 3 wt % of 6-(dibutylamino)-1,3,5-triazine-2,4-dithiol and 1 wt % of $LiNO_3$ are added, and a lithium-sulfur battery electrolyte containing 3 wt % of 6-(dibutylamino)-1,3,5-triazine-2,4-dithiol is obtained after uniform mixing.

Battery assembly: a pole piece coated with sulfur-carbon cathode material is cut into circular pole pieces with a diameter of 12 mm by a punching machine, and the sulfur loading is 1.2 mg/cm$^2$. The lithium-sulfur battery electrolyte prepared in Embodiment 3 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance test is the same as in Embodiment 1.

Embodiment 4

Preparation of electrolyte: in a glove box ($O_2$, $H_2O$<0.01 ppm) filled with argon, LiTFSI is added to a mixed solvent of DME and DOL, where DME:DOL (V:V)=1:1, and then 1 wt % of 4-amino-1,3,5-triazine-2-thiol and 2 wt % of $LiNO_3$ are added, and a lithium-sulfur battery electrolyte containing 1 wt % of 4-amino-1,3,5-triazine-2-thiol is obtained after uniform mixing.

Battery assembly: a pole piece coated with sulfur-carbon cathode material is cut into circular pole pieces with a diameter of 12 mm by a punching machine, and the sulfur loading is 1.5 mg/cm$^2$. The lithium-sulfur battery electrolyte prepared in Embodiment 4 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance test is the same as in Embodiment 1.

Embodiment 5

Preparation of electrolyte: in a glove box ($O_2$, $H_2O$<0.01 ppm) filled with argon, LiTFSI is added to a mixed solvent of DME and DOL, where DME:DOL (V:V)=1:1, and then 1 wt % of 4-phenyl-1,3,5-triazine-2-thiol and 2 wt % of $LiNO_3$ are added, and a lithium-sulfur battery electrolyte containing 1 wt % of 4-phenyl-1,3,5-triazine-2-thiol is obtained after uniform mixing Battery assembly: a pole piece coated with sulfur-carbon cathode material is cut into circular pole pieces with a diameter of 12 mm by a punching machine, and the sulfur loading is 1.2 mg/cm$^2$. The lithium-sulfur battery electrolyte prepared in Embodiment 5 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance test is the same as in Embodiment 1.

Embodiment 6

Preparation of electrolyte: in a glove box ($O_2$, $H_2O$<0.01 ppm) filled with argon, LiTFSI is added to a mixed solvent of DME and DOL, where DME:DOL (V:V)=1:1, and then 1 wt % of 5,6-diphenyl-[1,2,4]triazine-3-thiol and 2 wt % of $LiNO_3$ are added, and a lithium-sulfur battery electrolyte containing 1 wt % of 5,6-diphenyl-[1,2,4]triazine-3-thiol is obtained after uniform mixing.

Battery assembly: a pole piece coated with sulfur-carbon cathode material is cut into circular pole pieces with a diameter of 12 mm by a punching machine, and the sulfur loading is 1 mg/cm$^2$. The lithium-sulfur battery electrolyte prepared in Embodiment 6 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance test is the same as in Embodiment 1.

Comparative Example 1 preparation of electrolyte: in a glove box ($O_2$, $H_2O$<0.01 ppm) filled with argon, 1.0 M of LiTFSI is added to a mixed solvent of DME and DOL, where DME:DOL (V:V)=1:1, and then 2 wt % of $LiNO_3$ is added, and a lithium-sulfur battery electrolyte without an additive is obtained after uniform mixing.

Battery assembly: a pole piece coated with sulfur-carbon cathode material is cut into circular pole pieces with a diameter of 12 mm by a punching machine, and the sulfur loading is 1 mg/cm$^2$. The lithium-sulfur battery electrolyte prepared in Comparative example 1 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance test is the same as in Embodiment 1.

Comparative Example 2

Preparation of electrolyte: in a glove box ($O_2$, $H_2O$<0.01 ppm) filled with argon, 1.0 M of LiTFSI is added to a mixed solvent of DME and DOL, where DME:DOL (V:V)=1:1, and then 1 wt % of $LiNO_3$ is added, and a lithium-sulfur battery electrolyte without an additive is obtained after uniform mixing.

Battery assembly: a pole piece coated with sulfur-carbon cathode material is cut into circular pole pieces with a diameter of 12 mm by a punching machine, and the sulfur loading is 1.5 mg/cm$^2$. The lithium-sulfur battery electrolyte prepared in Comparative example 2 is used, and the electrolyte amount is 20 μL/mg·S. Celgard-2500 with a diameter of 18 mm is used as the separator, and the metal lithium sheet with a diameter of 15 mm is used as the anode, and CR2025 stainless steel is used as the battery case. The lithium-sulfur battery is assembled in the glove box filled with argon.

The electrochemical performance is the same as in Embodiment 1.

Embodiments 2-3 and Embodiments 7-13 of the disclosure are compared with Embodiment 1 of the disclosure, and the differences are that the concentrations of 6-(dibutylamino)-1,3,5-triazine-2,4-dithiol and $LiNO_3$ in the electrolyte are different, and the sulfur loading of the positive electrode is different. Embodiment 14 is compared with Embodiment 4, the difference is that the concentrations of 4-amino-1,3,5-triazine-2-thiol and $LiNO_3$ in the electrolyte are different, and the sulfur loading of the positive electrode is different. Similarly, the differences between Embodiment 15 and Embodiment 5, and Embodiment 16 and Embodiment 6 are that the concentrations of additives and $LiNO_3$ in the electrolyte are different, and the sulfur loading of the cathode is different. Specific parameter settings for each embodiment and and comparative example are summarized in Table 1.

TABLE 1

| Sample | Additive type | Additive content (wt %) | $LiNO_3$ content (wt %) | Sulfur loading (mg/cm$^2$) |
|---|---|---|---|---|
| Embodiment 1 | 6-(dibutylamino)-1,3,5-triazine-2,4-dithiol | 1 | 2 | 1 |
| Embodiment 2 | 6-(dibutylamino)-1,3,5-triazine-2,4-dithiol | 0.5 | 1 | 1.5 |
| Embodiment 3 | 6-(dibutylamino)-1,3,5-triazine-2,4-dithiol | 3 | 1 | 1.2 |
| Embodiment 4 | 4-amino-1,3,5-triazine-2-thiol | 1 | 2 | 1.5 |
| Embodiment 5 | 4-phenyl-1,3,5-triazine-2-thiol | 1 | 2 | 1.2 |
| Embodiment 6 | 5,6-diphenyl-[1,2,4]triazine-3-thiol | 1 | 2 | 1 |
| Embodiment 7 | 6-(dibutylamino)-1,3,5-triazine-2,4-dithiol | 0.2 | 2 | 1 |
| Embodiment 8 | 6-(dibutylamino)-1,3,5-triazine-2,4-dithiol | 0.2 | 1 | 1.2 |
| Embodiment 9 | 6-(dibutylamino)-1,3,5-triazine-2,4-dithiol | 2 | 2 | 1 |
| Embodiment 10 | 6-(dibutylamino)-1,3,5-triazine-2,4-dithiol | 2 | 1 | 1.5 |
| Embodiment 11 | 6-(dibutylamino)-1,3,5-triazine-2,4-dithiol | 1 | 1 | 1.5 |
| Embodiment 12 | 6-(dibutylamino)-1,3,5-triazine-2,4-dithiol | 0.5 | 2 | 1.2 |
| Embodiment 13 | 6-(dibutylamino)-1,3,5-triazine-2,4-dithiol | 3 | 2 | 1.2 |
| Embodiment 14 | 4-amino-1,3,5-triazine-2-thiol | 2 | 1 | 1 |
| Embodiment 15 | 4-phenyl-1,3,5-triazine-2-thiol | 2 | 1 | 1.5 |
| Embodiment 16 | 5,6-diphenyl-[1,2,4]triazine-3-thiol | 0.5 | 1 | 1.2 |
| Comparative example1 | None | None | 2 | 1 |
| Comparative example2 | None | None | 1 | 1.5 |

Results of specific capacity of the assembled lithium-sulfur battery after 100 cycles at a current density of 1 C are summarized in Table 2.

TABLE 2

| Sample | Initial specific capacity (mAh/g) | Specific capacity after cycling (mAh/g) | Capacity retention rate (%) | Average coulombic efficiency (%) |
|---|---|---|---|---|
| Embodiment 1 | 1373.7 | 943.2 | 68.66 | 99.80 |
| Embodiment 2 | 1236.6 | 798.2 | 64.55 | 98.61 |
| Embodiment 3 | 1174.2 | 685.9 | 58.41 | 98.29 |
| Embodiment 4 | 1132.3 | 658.4 | 58.15 | 99.31 |
| Embodiment 5 | 1129.6 | 642.8 | 56.90 | 99.12 |
| Embodiment 6 | 1146.2 | 638.7 | 55.72 | 99.08 |
| Embodiment 7 | 1221.4 | 837.8 | 68.59 | 99.73 |
| Embodiment 8 | 1187.5 | 707.9 | 59.61 | 98.82 |
| Embodiment 9 | 1369.2 | 909.7 | 66.44 | 99.44 |
| Embodiment 10 | 1289.3 | 837.5 | 64.95 | 98.43 |
| Embodiment 11 | 1303.9 | 862.3 | 66.13 | 99.24 |
| Embodiment 12 | 1317.8 | 854.9 | 64.87 | 99.74 |
| Embodiment 13 | 1323.6 | 774.1 | 58.48 | 99.59 |
| Embodiment 14 | 1120.8 | 628.6 | 56.08 | 99.13 |
| Embodiment 15 | 1138.6 | 607.3 | 53.34 | 99.31 |
| Embodiment 16 | 1170.2 | 610.6 | 52.18 | 98.97 |
| Comparative example1 | 1121.5 | 583.6 | 52.04 | 99.29 |
| Comparative example2 | 1048.6 | 531.8 | 50.71 | 98.62 |

It may be seen from Table 2 that Embodiment 1 has a highest initial discharge specific capacity compared with other embodiments and comparative examples, which is 1373.7 mAh/g, and a capacity retention rate is 68.66%, while an average coulombic efficiency is 99.78%. Meanwhile, by comparing the data of various embodiments and comparative examples, it may be seen that the addition of the additive 6-(dibutylamino)-1,3,5-triazine-2,4-dithiol may significantly improve the discharge specific capacity and the coulombic efficiency of the lithium-sulfur battery. However, an additive content needs to be controlled to an appropriate proportion to achieve a best performance. According to the data comparison, the disclosure determines that an addition amount of Embodiment 1 is the most appropriate. Besides Embodiment 1 and Comparative example 1, by comparing the data in Table 1 and Table 2, it may be found that the capacity retention rate and the coulombic efficiency are obviously improved even when a dosage of $LiNO_3$ is 1 wt %.

Figure 2:
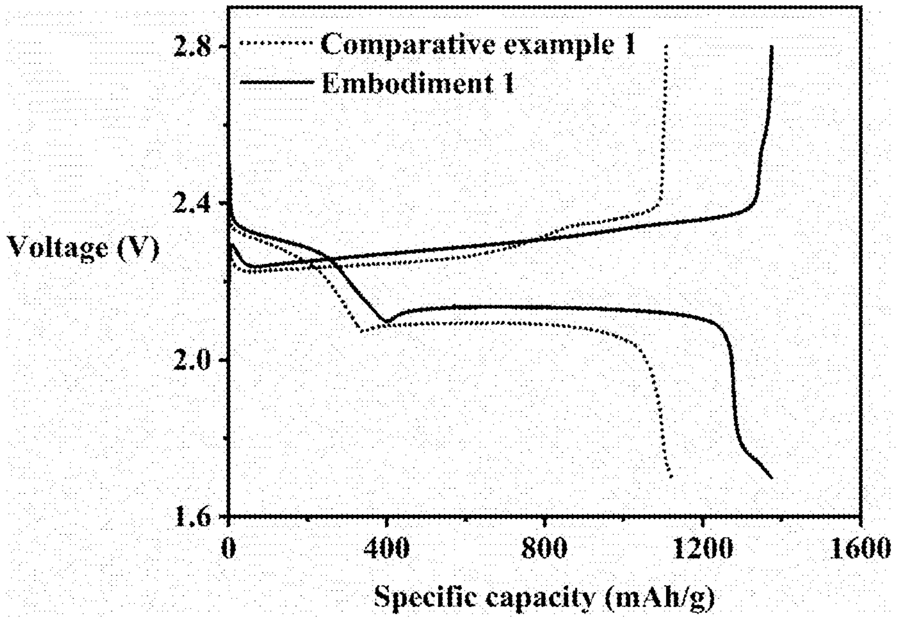
FIG. 2 shows first cycle charge-discharge curves of the lithium-sulfur battery containing 6-(dibutylamino)-1,3,5-triazine-2,4-dithiol in Embodiment 1 of the disclosure and no 6-(dibutylamino)-1,3,5-triazine-2,4-dithiol in Comparative example 1.

Comparisons of cycle performance and first cycle charge-discharge curves of the lithium-sulfur batteries in Embodiment 1 and Comparative example 1 are shown in FIG. 1 and FIG. 2, respectively. It may be seen that the capacity attenuation of Embodiment 1 is weaker, and the specific discharge capacity is higher. Through the comparison of the charge-discharge curves, it may also be seen that adding 6-(dibutylamino)-1,3,5-triazine-2,4-dithiol may effectively reduce the polarization of the battery and bring more discharge capacity in a conversion stage of long-chain polysulfides.

Figure 3:
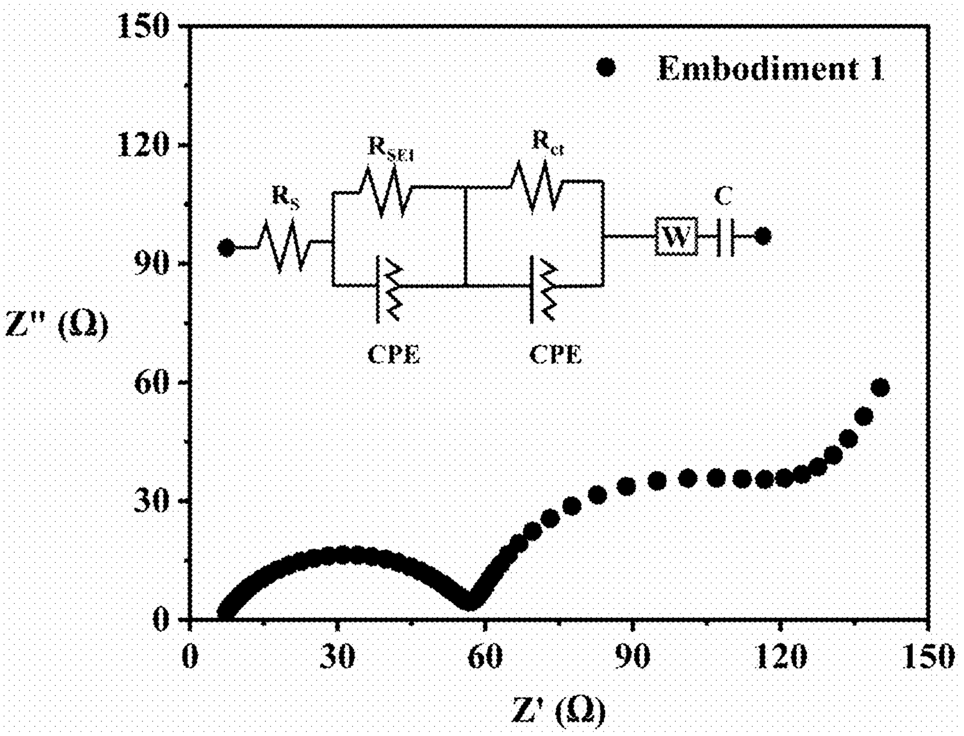
FIG. 3 shows an electrochemical alternating current (AC) impedance diagram and an equivalent circuit diagram of the lithium-sulfur battery containing 6-(dibutylamino)-1,3,5-triazine-2,4-dithiol in Embodiment 1 of the disclosure.
Figure 4:
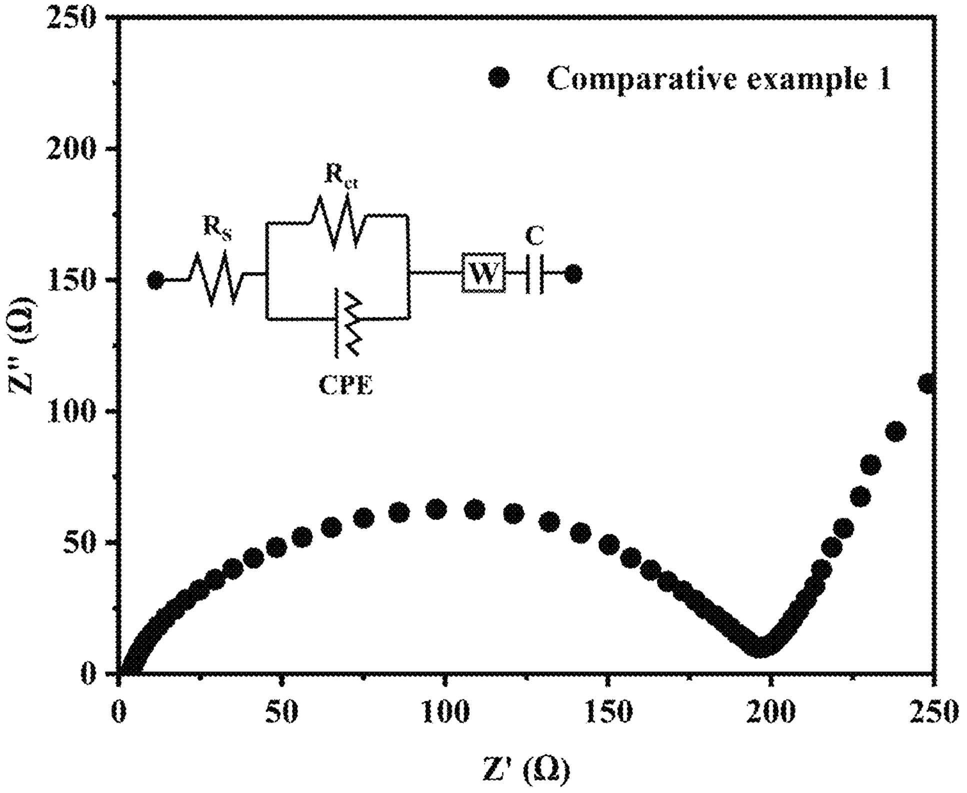
FIG. 4 shows an AC impedance diagram and an equivalent circuit diagram of the lithium-sulfur battery without 6-(dibutylamino)-1,3,5-triazine-2,4-dithiol in Comparative example 1 of the disclosure.

An AC impedance spectrum and a corresponding equivalent circuit diagram of Embodiment 1 are shown in FIG. 3, and an AC impedance spectrum and a corresponding equivalent circuit diagram of Comparative example 1 are shown in FIG. 4. Electrochemical AC impedance testing and fitting the corresponding equivalent circuit are one of the effective methods to judge the SEI generation. Therefore, by comparison, it may be seen that a semicircle appears in a high frequency region of Embodiment 1, which shows that there is indeed SEI generation in combination with the fitted equivalent circuit diagram, while there is no SEI generation in Comparative example 1. The SEI may alleviate the influence of the polysulfides on a lithium metal anode interface, thereby improving the coulombic efficiency of the lithium-sulfur battery. Moreover, a smaller charge transfer impedance of Embodiment 1 shows that a charge transfer speed is faster than that of Embodiment 1, and an overall electrochemical performance of the lithium-sulfur battery is improved.

In general, the disclosure has following advantages by adding the bifunctional additive of the triazine thiol compound into the electrolyte of the lithium-sulfur battery.

Firstly, two thiol molecular groups (S—H) contained in a triazine group of the bifunctional additive may react with polysulfides, so that long-chain polysulfides ($Li_2S_n$ ($4<n<8$)) are transformed into short-chain $Li_2S_n$ ($1<n<3$). The reaction products of the two groups participate in a subsequent redox reaction process, so a conversion pathway of the polysulfides is regulated and the shuttle effect caused by long-chain polysulfides is suppressed, and the discharge capacity and cycle stability of the lithium-sulfur battery are obviously improved. Without the addition of such additives, the long-chain polysulfides may not be converted and exist in the cathode and the anode of the battery, and the shuttle effect is intensified, resulting in a negative impact on both the cathode and the anode. Therefore, the electrochemical performance is obviously reduced.

Secondly, the added bifunctional additive of the triazine thiol compound has triazine groups, and the triazine groups are six-membered heterocyclic compounds with three nitrogen atoms and six delocalized electrons. The three N atoms are hybridized by $sp^2$ as the three C atoms, and all the atoms are in a same plane, so the atoms have aromaticity in a traditional sense. Therefore, x bonds in triazine molecules may be constructed with other types of bonds to form a larger molecular structure or a more stable structure, so N of triazine molecules may form stable C—N bonds with C and N—S—C bonds with S and C, which are the main structures of the SEI formed at the anode before discharge. Moreover, the substances formed by an interaction of this additive with S and Li also participate in the formation of this SEI layer, providing a special transmission interface for $Li^+$. On the one hand, the corrosion of the polysulfide on the anode may be slowed down, and on the other hand, the lithium ion transmission may be accelerated, thus improving the coulombic efficiency of the lithium-sulfur battery.

Therefore, the triazine thiol compound according to the disclosure is bifunctional as an additive, and may play a role in the cathode interface and the anode interface of the lithium-sulfur battery. At the same time, it indicates that high-performance lithium-sulfur batteries may be better realized through joint improvements in many aspects.

The above are only preferred embodiments of the disclosure. However, a protection scope of the disclosure is not limited to this. Any change or substitution that may be easily thought of by a person familiar with the technical field within the technical scope disclosed by the disclosure should be included in the protection scope of the disclosure. Therefore, the protection scope of the disclosure should be based on the protection scope of claims.

What is claimed is:

1. A lithium-sulfur battery, comprising a cathode material, an anode material, a separator and a battery electrolyte containing a bifunctional additive;

the bifunctional additive is a triazine thiol compound, and the triazine thiol compound is at least one of 6-(dibutylamino)-1,3,5-triazine-2,4-dithiol, 4-amino-1,3,5-triazine-2-thiol, 4-phenyl-1,3,5-triazine-2-thiol and 5,6-diphenyl-[1,2,4]triazine-3-thiol, a concentration of the bifunctional additive in the battery electrolyte is 0.2-3 wt %.

2. The lithium-sulfur battery according to claim 1, wherein the battery electrolyte further comprises an ether solvent and a lithium salt.

3. The lithium-sulfur battery according to claim 2, wherein the ether solvent is a mixed solution of ethylene glycol dimethyl ether and 1,3-dioxolane.

4. The lithium-sulfur battery according to claim 3, wherein a volume ratio of the ethylene glycol dimethyl ether to the 1,3-dioxolane is 1:1.

5. The lithium-sulfur battery according to claim 2, wherein the lithium salt is a mixture of lithium bis(trifluoromethylsulfonyl) imide and lithium nitrate.

6. The lithium-sulfur battery according to claim 1, wherein the cathode material is a sulfur-carbon cathode material, and sulfur loading is 1-1.5 $mg \cdot cm^{-2}$.

7. The lithium-sulfur battery according to claim 1, wherein the anode material is lithium metal sheet.

* * * * *